United States Patent
De La Renaudiere

(10) Patent No.: US 7,798,636 B2
(45) Date of Patent: Sep. 21, 2010

(54) EYEWEAR ITEM, ESPECIALLY GLASSES FRAMES, COMPRISING A SUPPORT PROVIDED WITH A THERMOFORMABLE FOAM

(76) Inventor: Francois-Regis Fradin De La Renaudiere, 20, rue Le Corbusier, Geneva (CH) CH-1208

( * ) Notice: Subject to any disclaimer, the term of this patent is extended or adjusted under 35 U.S.C. 154(b) by 37 days.

(21) Appl. No.: 12/122,857

(22) Filed: May 19, 2008

(65) Prior Publication Data
US 2008/0259271 A1 Oct. 23, 2008

Related U.S. Application Data

(63) Continuation of application No. PCT/EP2006/011102, filed on Nov. 20, 2006.

(51) Int. Cl.
*G02C 5/12* (2006.01)
(52) U.S. Cl. ............................. 351/80; 351/78; 351/136; 351/137; 351/138; 351/139
(58) Field of Classification Search .................... 351/76, 351/78, 131, 132, 136–139, 41, 80
See application file for complete search history.

(56) References Cited

U.S. PATENT DOCUMENTS

| | | | |
|---|---|---|---|
| 3,597,053 A | 8/1971 | Mastman | |
| 4,953,967 A * | 9/1990 | Somerville | 351/136 |
| 5,092,666 A | 3/1992 | Cress | |
| 5,196,871 A * | 3/1993 | Tom | 351/132 |
| 5,390,373 A * | 2/1995 | Flory | 2/430 |
| 7,140,729 B2 * | 11/2006 | Resler et al. | 351/156 |

FOREIGN PATENT DOCUMENTS

| | | |
|---|---|---|
| DE | 3130144 | 2/1983 |
| JP | 2004339362 | 12/2004 |

* cited by examiner

*Primary Examiner*—Hung X Dang
(74) *Attorney, Agent, or Firm*—Sturm & Fix LLP

(57) ABSTRACT

The invention relates to an eyewear item, especially glasses frames or an optical mask, comprising a bridge (1) or a browbar (14). According to the invention, the bridge (1) or browbar (14) comprises a support (5) having a thickness (4) consisting of a thermoformable foam (3), and thermally conforming by receiving an impression following the heating of the thickness (4), then being applied to an anatomic region of a carrier, and keeping said impression after cooling. Preferably, the foam has a thermal conductivity of less than 0.040 W/m·K, preferably equal to 0.034 W/m·K. More specifically, the foam is a cross-linked polyolefin. In one mode of embodiment, the support (5) has a concave (6) or convex (7) profile to which the foam (3) is fixed in the form of a film contouring the concave or convex profile.

20 Claims, 6 Drawing Sheets

EYEWEAR ITEM, ESPECIALLY GLASSES FRAMES, COMPRISING A SUPPORT PROVIDED WITH A THERMOFORMABLE FOAM

CROSS REFERENCE TO RELATED APPLICATIONS

This application is a Continuation application of PCT/EP2006/011102 filed Nov. 20, 2006, claiming priority of FR 0511735 filed Nov. 21, 2005, which are incorporated by reference herein in their entirety.

BACKGROUND OF THE INVENTION

1. Field of the Invention

The invention relates to an item of eyewear, in particular a glasses frame or an optical mask, including more particularly two lenses connected by a bridge or by a brow-bar.

2. Description of the Related Art

Such a glasses frame is known for example from document U.S. Pat. No. 5,092,666. According to this document, the bridge serves as a support for a rest which conforms so that it takes and retains an anatomical impression corresponding to the junction of the nose and the forehead of an individual. The rest includes a part made of a silicone elastomer. When the glasses frame is in position on an individual, gentle pressure is exerted on the bridge to take an anatomical impression in the silicone elastomer. The frame is then removed from the wearer and the silicone elastomer is exposed to ultraviolet rays to fix the anatomical impression via a chemical cross-linking reaction.

The anatomical impression on the rest gives the glasses frame greater stability for the wearer from whom the anatomical impression has been taken. However, the cross-linked silicone elastomer has a hardness and a resistance to penetration which are higher than in its non cross-linked state and which may be felt by the wearer as a lesser degree of comfort.

Document U.S. Pat. No. 3,597,053 discloses a glasses frame including a bridge which includes a support provided with a small container filled with liquid, for example glycerine, or provided with a thermoplastic material which thermally conforms to take an anatomical impression after heating and to retain this impression after cooling. The thermoplastic material, rigid at ambient temperature, becomes softened during heating and returns to its rigid state after cooling.

Document DE 31 30 144 discloses a glasses frame including a bridge which includes a support provided with a thermally deformable material which rigidifies in its deformed shape during cooling, with cushions of air or with a material capable of adopting the shape of the nose of the wearer of the frame, such as a rubber-like material or a foam. In this latter case, when the glasses frame is no longer worn by the user, the rubber or foam returns to its non-deformed state of equilibrium.

SUMMARY OF THE INVENTION

The purpose of the invention is to modify a glasses frame of the type described in the introduction, in order to remedy the disadvantage of a rest retaining a rigid anatomical impression or losing the anatomical impression as soon as the glasses frame is no longer worn.

To that end, the subject of the invention is an item of eyewear, in particular a glasses frame or an optical mask, including a bridge or a brow-bar, characterised in that the bridge or the brow-bar includes a support provided with a layer of thermo-formable foam which thermally conforms by taking an impression after the layer of foam is heated and then applied to an anatomical area of a wearer and by retaining that impression after cooling.

The foam conforms thermally according to the anatomical impression via a simple shrinking back which produces a local diminution in the layer. It involves a physical phenomenon which does not change the mechanically absorbent nature of the foam. The result of this is that the support and the layer of foam form a rest which provides both, greater stability for the wearer whose impression has been taken and a greater feeling of comfort.

The foam is preferably a cross-linked polyolefin. Provision is made for it to be glued to the bridge of the glasses frame or to the brow-bar. In this case, the support is integrated with the bridge or with the brow-bar. This is the case, for example, with a glasses frame of plastic material. Preferably, however, the support is fixed to the bridge or to the brow-bar in a removable way, so that the layer of foam can be heated separately from the glasses frame. The support is fixed to the bridge or to the brow-bar using, for example, notches in order to engage with the bridge or the brow-bar by elastic pinching.

The support is integrated with or fixed to the bridge so that the layer of foam takes and retains the anatomical impression corresponding to the junction of the nose and the forehead of an individual. When it is integrated with or fixed to the brow-bar, the support allows the layer of foam to take and retain the anatomical impression corresponding to the superciliary arches of the individual.

The support advantageously has a concave or convex profile to which the foam is fixed, for example in the form of a sheet of constant thickness, adopting the concave or convex profile. A concave profile enables the junction of the nose and forehead of the individual to be followed more closely along a vertical line whilst a convex profile enables this junction to be followed more closely along a horizontal line. The support thus allows a more uniform distribution of the deformation of the foam when the impression is taken, which again helps to increase the feeling of comfort.

Other advantages will appear in the light of the description of five embodiments of the invention illustrated by drawings.

DETAILED DESCRIPTION OF THE PREFERRED EMBODIMENT

Figure 1:
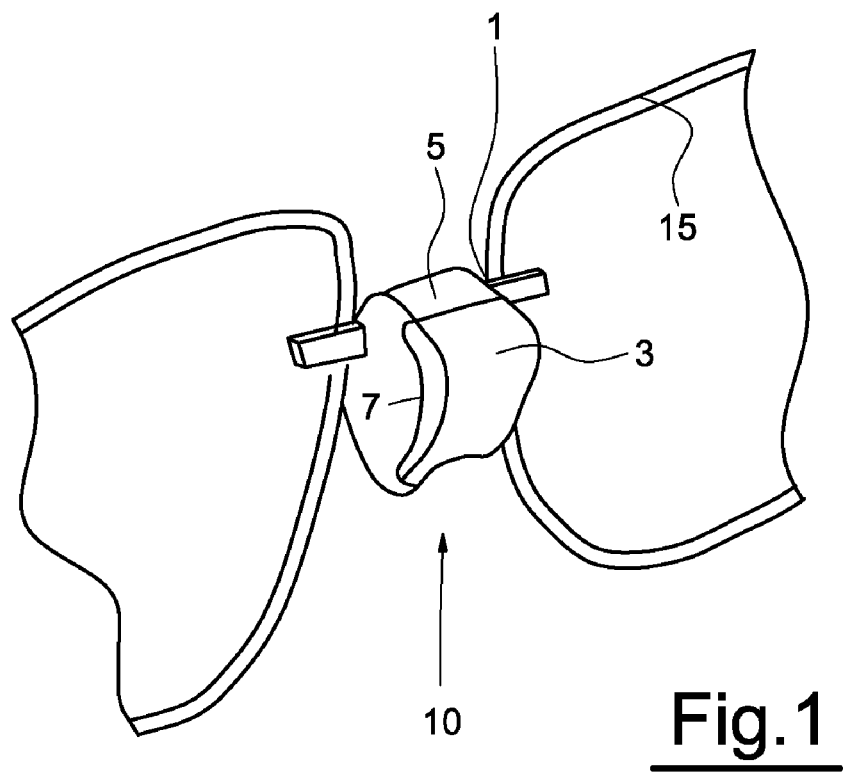
FIG. 1 is a diagrammatic perspective view of a glasses frame according to a first embodiment where the bridge of the frame is a single small bar.

With reference to FIGS. 1 to 7, a glasses frame includes a bridge 1 to connect the two lenses 15 of the frame to one another.

According to the invention, the bridge 1 includes a support 5 on to which is fixed a layer of foam 3 conforming thermally to take after heating, and retain after cooling, an anatomical impression corresponding to the junction of the nose and the forehead of an individual.

In the first embodiment of the invention, FIGS. 1 to 6, the support 5 has a convex profile 7 so that it more closely follows the junction of the nose and the forehead of an individual along a vertical line. The layer of foam 3 consists of a sheet fixed to the support 5 and following the convex profile 7. This arrangement allows a more uniform distribution of the deformation of the foam along the convex profile when the anatomical impression is taken. The sheet of foam may be replaced by specks of foam distributed over the convex profile of the support.

Figure 4:
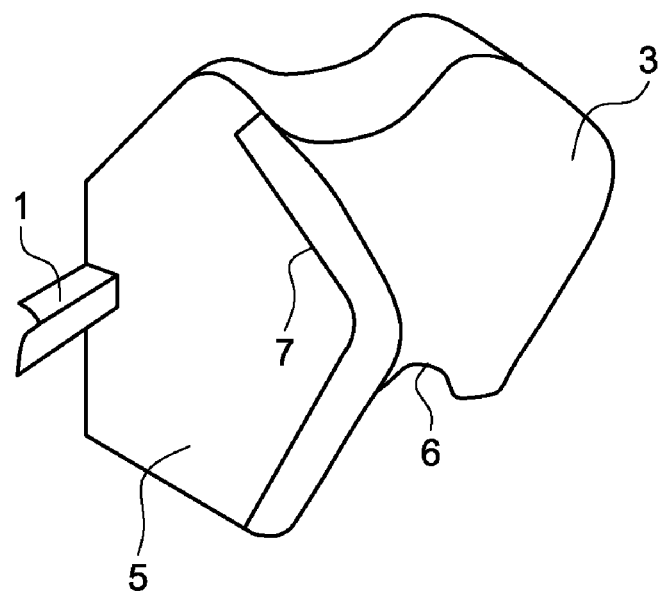
FIG. 4 is a diagrammatic perspective view of a glasses frame which is differentiated from the frame shown in FIG. 1 by the fact that the support for the layer of foam has a concave profile in a horizontal plane and a convex profile in a vertical plane.
Figure 5:
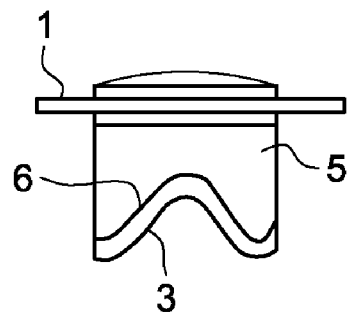
FIG. 5 is a view in cross-section of the support and the layer of foam shown in FIG. 4.

Provision is made to give the support 5 a concave profile 6 so that it may more closely follow, along a horizontal line, the junction of the nose and the forehead of the wearer whose anatomical impression is taken. Provision is also made to combine a concave profile 6 and a convex profile 7 in the same support, as shown in FIG. 4.

Figure 2:
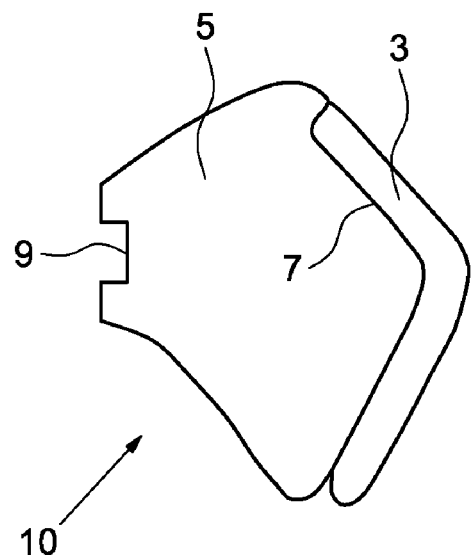
FIG. 2 is a view in cross-section showing the support for the layer of foam, to be fixed to the bridge in the form of a single small bar of the frame shown in FIG. 1.
Figure 3:
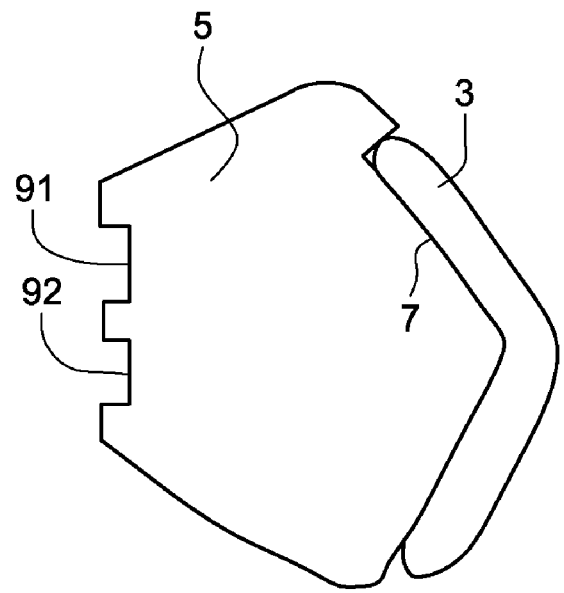
FIG. 3 is a view in cross-section showing another support for the layer of foam, to be fixed to a bridge in the form of a double small bar.
Figure 6:
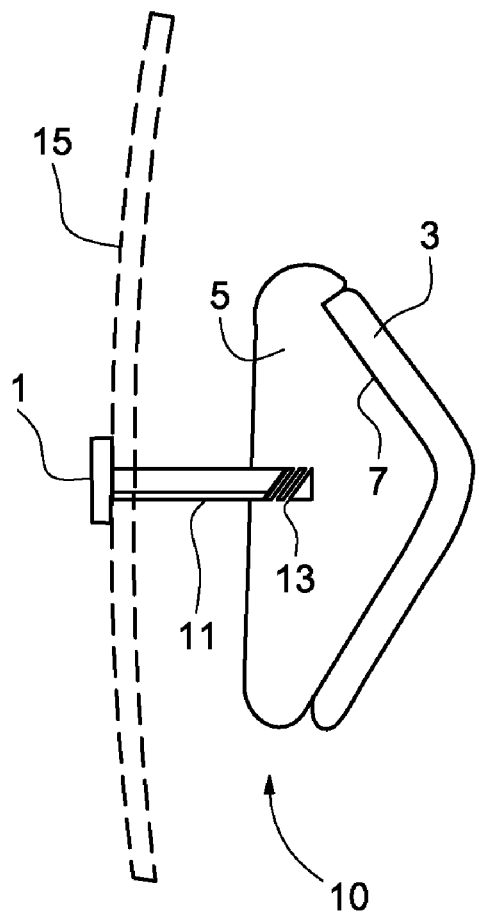
FIG. 6 is a view in cross-section showing another support for the layer of foam, to be fixed by a screw to the bridge of the frame shown in FIG. 1.

The rest 10 comprising the support 5 and the layer of foam 3 is fixed to the bridge 1 of the glasses frame via notches 9, FIG. 2, exerting an elastic pinching on the single small bar of the bridge. A plurality of notches 91, 92, FIG. 3, are provided to enable the support 5 to be fixed to a bridge having the form of a double small bar or to provide adjustment in the vertical position of the support 5 relative to the bridge with a single small bar. FIG. 6 shows another method of fixing the support 5 to the bridge of the glasses frame, using a rod 11 welded to the bridge 1 on to which rod the support 5 is screwed in a threaded bore 13.

Figure 7:
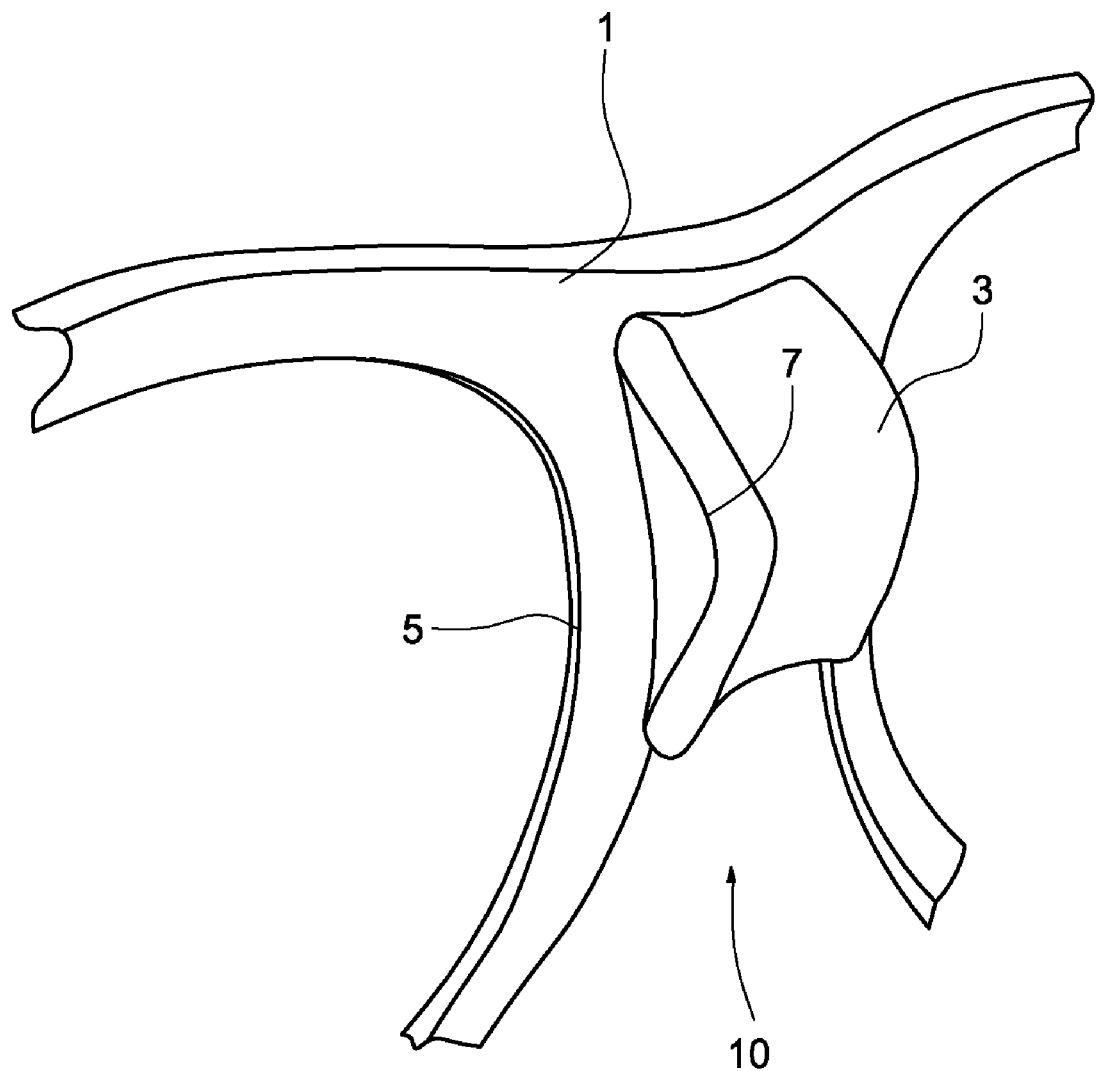
FIG. 7 is a diagrammatic perspective view of a glasses frame according to a second embodiment where the support for the layer of foam is integrated into the bridge of the frame.

The second embodiment of the invention, FIG. 7, concerns a glasses frame of plastic material. Here, the support 5 is integrated with the bridge 1. During manufacture of the glasses frame by injection of the plastic material, the support 5 is for example formed by a concave modification to the injection mould.

Figure 8:
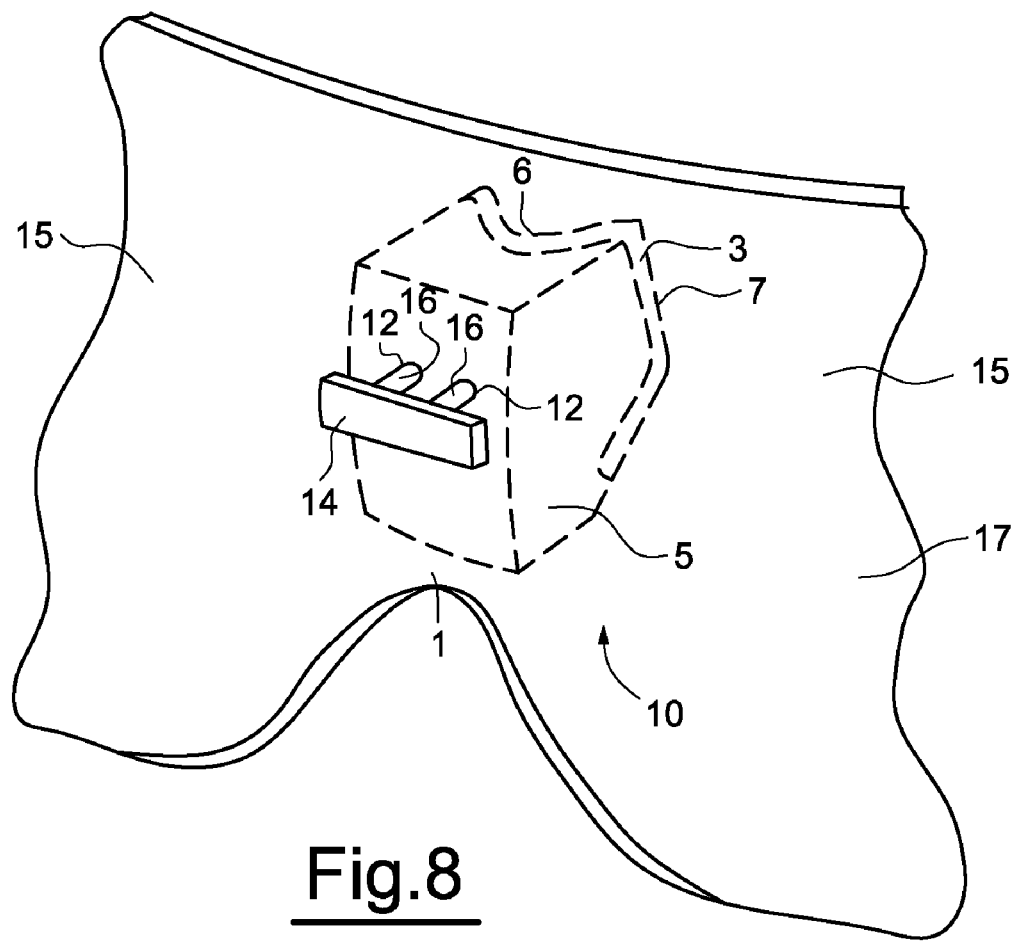
FIG. 8 is a diagrammatic view of an optical mask, for example a solar optical mask, comprising a single piece forming two lenses and a bridge on to which, according to a third embodiment of the invention, the support for the layer of foam is fixed.

The third embodiment of the invention concerns, FIG. 8, an optical mask, for example a solar optical mask, comprising a single piece 17 forming two lenses 15 joined by a bridge 1. The single piece 17 is of an organic material, for example polycarbonate or polyamide. The support 5 is fixed to the bridge 1 by means of a plate 14 fixed relative to two rods 12, themselves held against the support 5 by elastic pinching, for example by a clip, after passing through the bridge 1 of the single piece 17 via two bores 16.

Figure 9:
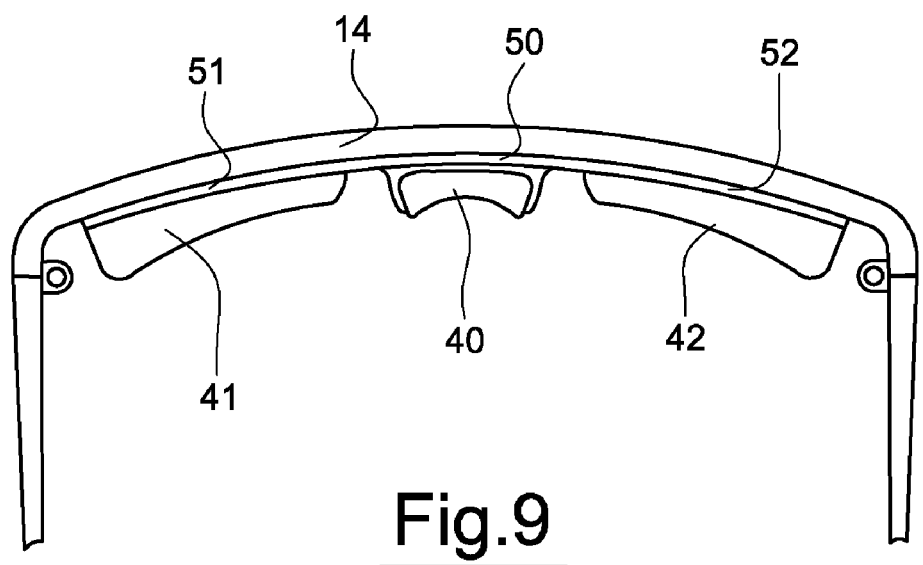
FIG. 9 shows a view from above of a glasses frame according to a fourth embodiment in which the support for the layer of foam is fixed to the brow-bar of the glasses frame.
Figure 10:
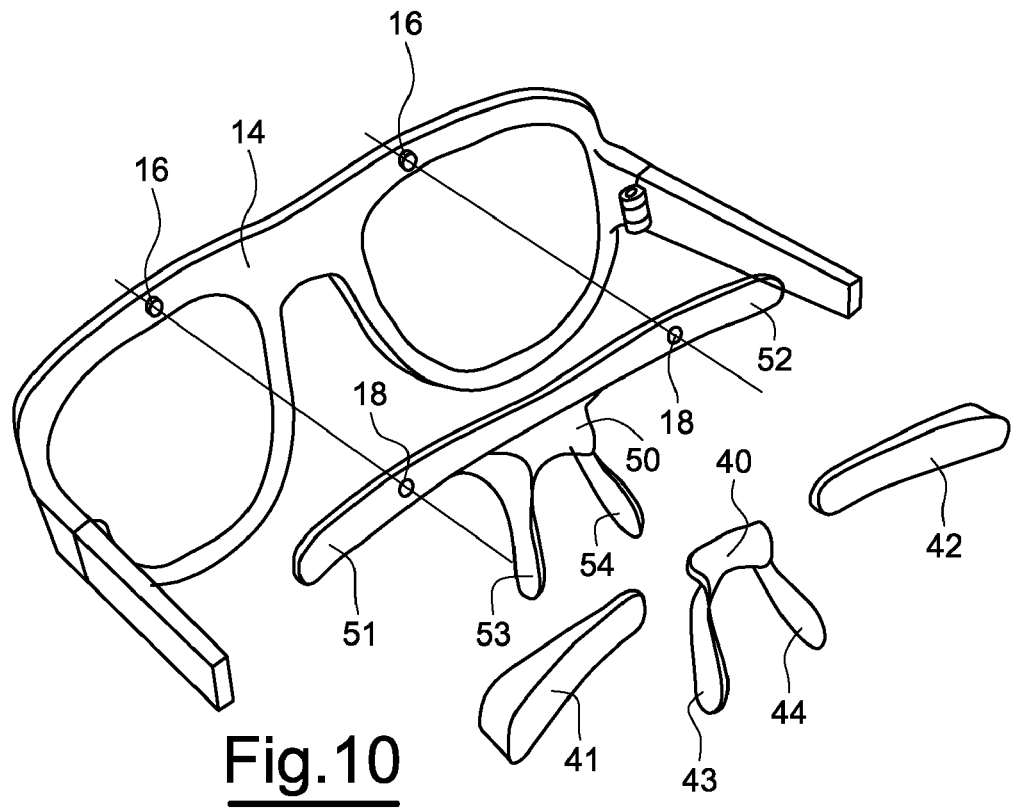
FIG. 10 is a perspective view of the glasses frame shown in FIG. 9.

In the fourth embodiment, FIGS. 9 and 10, the support 5 is fixed to the brow-bar 14 of the glasses frame. Fixing is achieved via, for example, studs 16 formed on the brow-bar for insertion in notches 18 formed in the support 5. In the embodiment more specifically illustrated, the support has a median part 51 and two lateral parts 50 and 52 disposed either side of the median part. A first layer of foam 3 adopts the simultaneously concave and convex profile of the median part 51, as described above with reference to FIG. 4, to take and retain the anatomical impression corresponding to the junction of the nose and the forehead of the wearer of the glasses frame. The two lateral parts 50 and 52 each have a layer of foam 3 to take and retain the anatomical impression corresponding to the superciliary arches of the wearer. This fourth embodiment is of particular interest in the case where the glasses frame is worn pulled towards the back of the head. The glasses frame then rests not only on the naso-frontal angle of the wearer, but also on the superciliary arches. The pressure, distributed over a larger area, is thus less and prolonged wear is more comfortable.

It should be noted that this embodiment is advantageously applied to glasses frames whose face is rigid, as is the case with many frames for corrective glasses. In this case, the thermoform-able foam enables the glasses frame to be adapted to the anatomy of the wearer, as regards both the naso-frontal angle and the superciliary arches, and to absorb shocks better.

Figure 11:
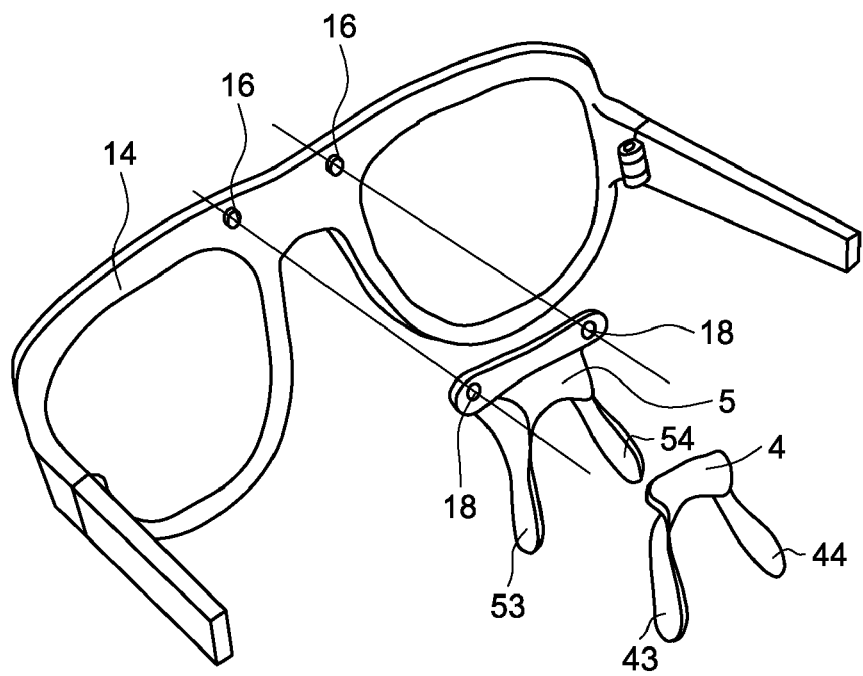
FIG. 11 is a perspective view of a glasses frame according to a fifth embodiment in which the support for the layer of foam includes two legs intended to be used as pads.

In the fifth embodiment illustrated in FIG. 11, the support 5 includes two legs 53, 54 intended to be used as pads and over which a layer 43, 44 of foam 3 extends. The support 5 is fixed to the brow-bar 14 in the same manner as that described for the fourth embodiment.

Preferably, the thermo-formable foam is a cross-linked closed-cell polyolefin. The density of the foam is approximately 30 kg/m$^3$. It may however be between 20 kg/m$^3$ and 40 kg/m$^3$. An anti-allergy treatment and an anti-bacterial treatment are applied to it before it is fixed to the bridge of the glasses frame or to the profiled support. Fixing is achieved by, for example, simply applying heat if the support is a high-density polyethylene or by glueing using a heat-activated adhesive.

The anatomical impression is taken by an optician. The latter pre-heats the support in such a way that the layer of foam reaches a temperature in the range 100 to 110 degrees Celsius. The heating time is approximately two minutes, proceeding gradually and using a traditional hot-air heater. The optician checks for the correct temperature by pressing on the layer of foam with a finger to confirm that it properly adopts the shape impressed by the finger.

It should be noted that the support provided with the layer of foam is fixed to the bridge or to the brow-bar in a removable way, so that it can be heated by the optician separately from the glasses frame. In this way, the risk of damaging the lenses during heating is reduced. The support is then refitted to the bridge or to the brow-bar so that the impression can then be taken.

The glasses frame is positioned on the wearer and the optician exerts a pressure of approximately 2 to 5 kg on the bridge of the frame. There are several possible methods: the frame may be pulled backwards by an elastic band around the wearer's head, tautened sufficiently to exert the desired pressure. The optician may also have the wearer place the back of their head against a headrest and exert the desired pressure himself.

The time required to take the impression is approximately 1 minute. The thermo-formable foam, once cooled, then retains the shape of the anatomical impression of the wearer.

It should be noted that the thermo-formable foam used according to the invention is an excellent thermal insulator, and preferably has a thermal conductivity which is less than 0.040 W/m·K, more specifically a thermal conductivity equal to 0.034 W/m·K, so that the rise in temperature is not perceptible to the touch. If necessary, the optician may protect the face of the wearer by applying a thermally insulating felt which is sufficiently thin to adopt the outline of the junction of the nose and forehead of the individual. For example, a polyester felt from 1 to 2 mm thick and with a surface density of approximately 200 g/m² can be used.

A glasses frame or an optical mask according to the invention offers both greater stability and greater comfort regardless of the anatomy of the wearer. It is particularly well suited to use during sport. To prevent any risk of losing the frame, the wearer may thus hold it in place using an elastic cord fixed to each side piece and passed around the head. The force applied to the glasses frame by the elastic cord does not give any feeling of discomfort but is on the contrary distributed over the whole rest conformed to the anatomy of the wearer by the layer of foam. In addition, the layer of foam reduces the risk of injury to the face in the event of a shock to the glasses frame.

The invention claimed is:

1. A glasses frame comprising a bridge provided with a rest to lie on the nose of a wearer, wherein the rest comprises a support and a layer of thermo-formable foam secured to the support, and wherein the support is fixed to the bridge in a removable way to allow the layer of thermo-formable foam to thermally conform by taking an impression after it is heated remotely from the bridge and then applied to the nose of a wearer and by retaining that impression after cooling.

2. A glasses frame according to claim 1, wherein the foam is a cross-linked polyolefin, having a density of between 20 kg/m³ and 40 kg/m³ and a thermal conductivity of less than 0.040 W/m·K.

3. A glasses frame according to claim 1, wherein the layer of foam adopts a concavo-convex profile of the support to thermally conform at the junction of the nose and the forehead of a wearer.

4. A glasses frame according to claim 1, wherein the support has notches so that it engages with the bridge by elastic pinching.

5. A glasses frame according to claim 1, wherein the support has a threaded bore to receive a rod for fixing relative to the bridge.

6. A glasses frame according to claim 1, wherein the layer of thermo-formable foam is formed by a distribution of specks of foam over the removable support.

7. A glasses frame according to claim 1, wherein the layer of thermo-formable foam is formed by a distribution of specks of foam over the removeable support.

8. An optical mask comprising two lenses and a bridge formed in a single piece, wherein the bridge is provided with a rest to lie on the nose of a wearer, wherein the rest comprises a support and a layer of thermo-formable foam secured to the support, and wherein the support is fixed to the bridge in a removable way to allow the layer of thermo-formable foam to thermally conform by taking an impression after it is heated remotely from the bridge and then applied to the nose of a wearer and by retaining that impression after cooling.

9. An optical mask according to claim 8, wherein the foam is a cross-linked polyolefin, having a density of between 20 kg/m³ and 40 kg/m³ and a thermal conductivity of less than 0.040 W/m·K.

10. An optical mask according to claim 8, wherein the support is fixed to the bridge by means of a plate fixed relative to a rod, itself held to the support by elastic pinching after passing through the bridge via a bore.

11. An optical mask according to claim 8, wherein the layer of foam adopts a concavo-convex profile of the support to thermally conform at the junction of the nose and the forehead of a wearer.

12. An optical mask according to claim 8, wherein the removable support comprises two pads over which a layer of foam extends.

13. A glasses frame according to claim 12, wherein the foam is a cross-linked polyolefin, having a density of between 20 kg/m³ and 40 kg/m³ and a thermal conductivity of less than 0.040 W/m·K.

14. A glasses frame according to claim 12, wherein the support has notches so that it engages with studs formed in the brow-bar.

15. A glasses frame according to claim 12, wherein the support has a threaded bore to receive a rod for fixing relative to the brow-bar.

16. A glasses frame according to claim 12, wherein the layer of foam adopts a concavo-convex profile of the support to thermally conform at the junction of the nose and the forehead of a wearer.

17. A glasses frame according to claim 12, wherein the removable support comprises two pads over which a layer of foam extends.

18. An optical mask according to claim 8, wherein the layer of thermo-formable foam is formed by a distribution of specks of foam over the removable support.

19. A glasses frame comprising a brow-bar provided with a rest to lie on the nose, wherein the rest comprises a support and a layer of thermo-formable foam secured to the support, and wherein the support is fixed to the brow-bar in a removable way to allow the layer of thermo-formable foam to thermally conform by taking an impression after it is heated remotely from the bridge and then applied to the nose of a wearer and by retaining that impression after cooling.

20. A glasses frame according to claim 19, wherein the layer of thermo-formable foam is formed by a distribution of specks of foam over the removable support.

* * * * *

UNITED STATES PATENT AND TRADEMARK OFFICE
CERTIFICATE OF CORRECTION

PATENT NO. : 7,798,636 B2
APPLICATION NO. : 12/122857
DATED : September 21, 2010
INVENTOR(S) : Francois-Regis Fradin De La Renaudiere It is certified that error appears in the above-identified patent and that said Letters Patent is hereby corrected as shown below:

Column 5, line 47, cancel the text beginning with "6. A glasses frame" to and ending "removable support." in column 5, line 49, and insert the following claim:
--6. A glasses frame according to claim 1, wherein the removable support comprises two pads over which a layer of foam extends.--

Column 5, line 50, cancel the text beginning with "7. A glasses frame" to and ending "removable support." in column 5, line 52, and insert the following claim:
--7. An optical mask comprising two lenses and a bridge formed in a single piece, wherein the bridge is provided with a rest to lie on the nose of a wearer, wherein the rest comprises a support and a layer of thermo-formable foam secured to the support, and wherein the support is fixed to the bridge in a removable way to allow the layer of thermo-formable foam to thermally conform by taking an impression after it is heated remotely from the bridge and then applied to the nose of a wearer and by retaining that impression after cooling.--

Column 5, line 53, cancel the text beginning with "8. An optical mask" to and ending "impression after cooling." in column 6, line 7, and insert the following claim:
--8. An optical mask according to claim 7, wherein the foam is a cross-linked polyolefin, having a density of between 20 kg/m3 and 40 kg/m3 and a thermal conductivity of less than 0.040 W/m.K.--

Column 6, line 8, cancel the text beginning with "9. An optical mask" to and ending "0.040 W/m.K." in column 6, line 11, and insert the following claim:
--9. An optical mask according to claim 7, wherein the support is fixed to the bridge by means of a plate fixed relative to a rod, itself held to the support by elastic pinching after passing through the bridge via a bore.--

Column 6, line 12, cancel the text beginning with "10. An optical mask" to and ending "via a bore." in column 6, line 15, and insert the following claim:
--10. An optical mask according to claim 7, wherein the layer of foam adopts a concavo-convex profile of the support to thermally conform at the junction of the nose and the forehead of a wearer.--

Signed and Sealed this

Twenty-first Day of December, 2010

David J. Kappos
*Director of the United States Patent and Trademark Office*

CERTIFICATE OF CORRECTION (continued)
U.S. Pat. No. 7,798,636 B2

Column 6, line 16, cancel the text beginning with "11. An optical mask" to and ending "of a wearer." in column 6, line19, and insert the following claim:
--11. An optical mask according to claim 7, wherein the removable support comprises two pads over which a layer of foam extends.--

Column 6, line 20, cancel the text beginning with "12. An optical mask" to and ending "foam extends." in column 6, line 22, and insert the following claim:
--12. A glasses frame comprising a brow-bar provided with a rest to lie on the nose, wherein the rest comprises a support and a layer of thermo-formable foam secured to the support, and wherein the support is fixed to the bridge in a removable way to allow the layer of thermo-formable foam to thermally conform by taking an impression after it is heated remotely from the bridge and then applied to the nose of a wearer and by retaining that impression after cooling.--

Column 6, line 40, cancel the text beginning with "18. An optical mask" to and ending "the removable support." in column 6, line 42, and insert the following claim:
--18. A glasses frame according to claim 1, wherein the layer of thermo-formable foam is formed by a distribution of specks of foam over the removable support.--

Column 6, line 43, cancel the text beginning with "19. A glasses frame" to and ending "impression after cooling." in column 6, line 50, and insert the following claim:
--19. An optical mask according to claim 7, wherein the layer of thermo-formable foam is formed by a distribution of specks of foam over the removable support.--

Column 6, line 51, delete "19" and insert --12--.